United States Patent [19]
Kronbergs

[11] 3,958,464
[45] May 25, 1976

[54] LIMITED SLIP DIFFERENTIAL

[76] Inventor: Janis Kronbergs, 947 Tavistock Road, Ottawa, Canada, K2B 5NG

[22] Filed: Feb. 24, 1975

[21] Appl. No.: 552,601

Related U.S. Application Data

[63] Continuation-in-part of Ser. No. 398,145, Sept. 11, 1973, abandoned.

[52] U.S. Cl. .................................................. 74/710
[51] Int. Cl.² ........................................ F16H 1/38
[58] Field of Search ................ 74/710, 710.5, 711, 74/713, 411; 64/15 C, 27 C, 27 CT

[56] References Cited
UNITED STATES PATENTS
3,227,003   1/1966   Thompson ........................ 74/710

Primary Examiner—Samuel Scott
Assistant Examiner—Frank H. McKenzie, Jr.

[57] ABSTRACT

Limited slip differential employing a spring-loaded housing for transferring power to a driven axle shaft to allow limited slippage in the other axle shaft. Design eliminates side gears.

7 Claims, 9 Drawing Figures

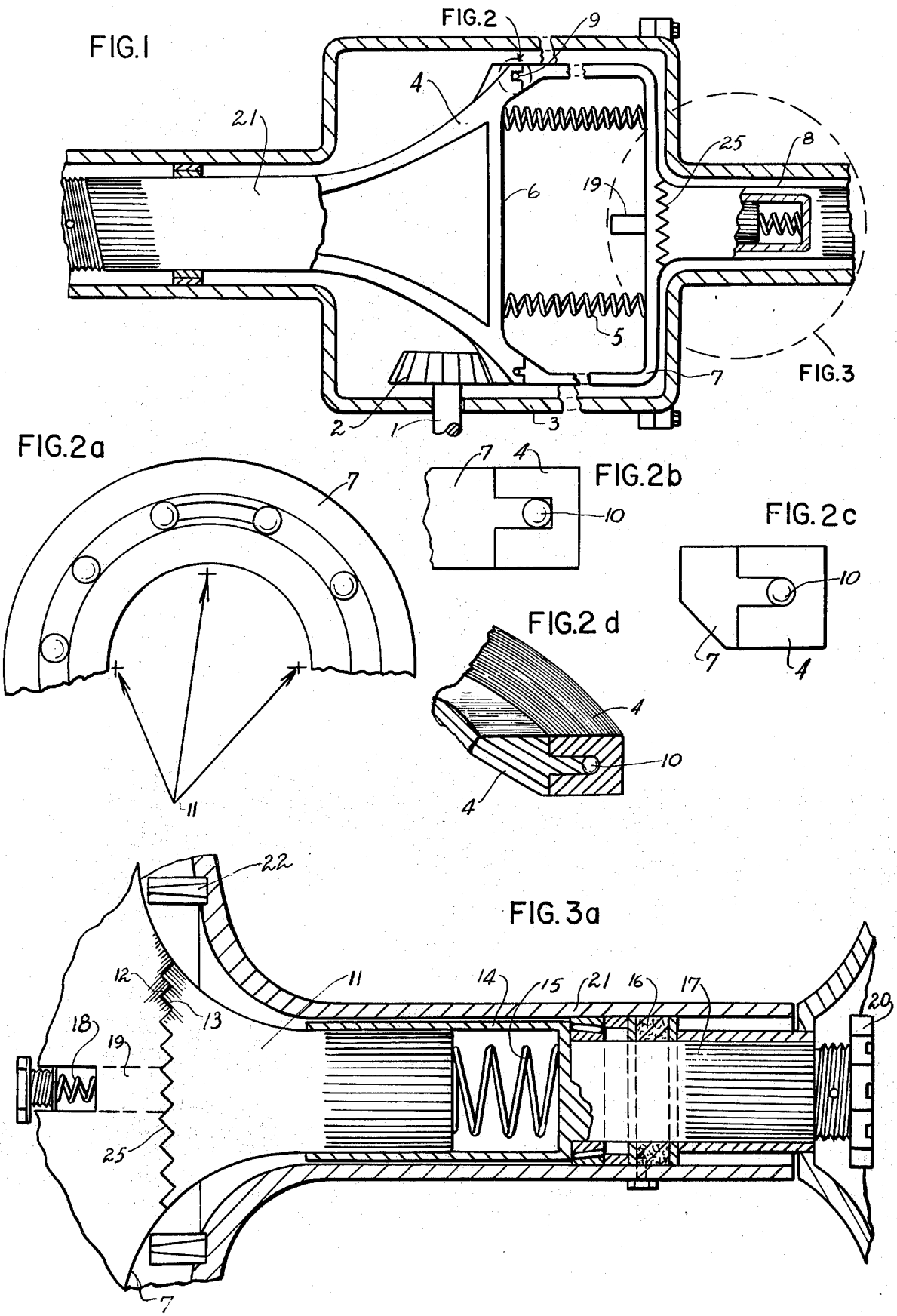

LIMITED SLIP DIFFERENTIAL

This application is a continuation-in-part of my application Ser. No. 398,145 now abandoned, filed Sept. 11, 1973.

FIELD OF THE INVENTION

The invention relates to limited slip differentials, and more particularly to differentials employing a spring-loaded housing for transferring power from a drive gear to one axle while a second axle is directly driven allowing the latter to move at different speed than the former.

DESCRIPTION OF THE PRIOR ART

Limited slip differentials employing friction clutches which are activated by the side gears which are urged outwardly for the purpose of allowing a limited slip of one axle relative to the other are described in U.S. Pat. No. 3,628,399. Various inserts in the form of conical clutches have also been described. These devices, while permitting limited slip between the axles, nevertheless are cumbersome, large and difficult to service.

SUMMARY OF THE INVENTION

Since loss of friction between the wheel and road surface results in wheel spin on one side, the invention provides a means of eliminating this inconvenience. Thus, in accordance with the invention, the differential gears are replaced with a limited slip drive to one wheel while maintaining full drive to the other wheel. Power flows from the motor crankshaft in the usual manner up to the pinion gear. The axle drive gear, which is driven, as usual, by the pinion gear, is modified, i.e., divided into two parts. Power is transferred from the pinion gear through the part directly to one axle shaft. To the other axle shaft, axle drive power is transferred by several spiral springs to a housing which is coupled to that axle. Thus, when moving in a straight line, both wheels turn at the same speed; however, when rounding a curve, the outside wheel turns faster than the inside wheel, and the springs absorb the tension produced by one of the wheels turning at a different speed.

The housing is of small dimensions and light in weight, which is advantageous. For assembly and final alignment of gears and axles as well as for subsequent inspection and maintenance, the end of the rear axle box can be easily and completely removed.

The invention will be described in further detail with reference to the drawing in which:

FIG. 1 is a sectional view through the mid-plane of a differential according to the invention showing the spring housing mechanism, and its relation to the tooth clutch and both axles;

FIGS. 2a, 2b, 2c and 2d show details of the spring housing assembly of the differential;

FIG. 3a shows the tooth clutch mechanism.

Figure 3B:
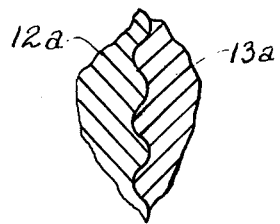
FIGS. 3b and 3c show different clutch plates.

In a limited slip differential according to the invention, power from the motro crankshaft flows up to pinion gear 2 as usual. The novel feature of this differential is transfer of power through the differential housing mechanism 3, and its application to ring gear 4.

Transfer of power from the ring gear 4 to the driving wheels is achieved by employing three or four rigid springs 5 of high tensile strength. These springs are attached to a ring gear plate 6 and to a cylindrical spring housing 7 and shaft 8, which in turn supplies power to the wheels.

This spring housing 7 fits into a circular groove 9 in which bearings 10 are provided, as shown in FIG. 2a, which also shows an end view of the ring gear plate 6 which is provided with markings 11 for attachement of springs 5 to the ring gear plate 6.

Springs 5 hold together housing 7 in such manner that it is a firm and stable unit. The bearing mechanism, i.e. bearings 10 in groove 9, is important, as it provides a freely moving, and flexible power transfer through springs 5. This is achieved because cylindrical housing 7 is able to rotate on ring gear 4 as power is applied.

Under no power, or conditions of equal stress, springs 5 are in a horizontal position, as shown. As power is applied, tension is placed on the springs through rotation of the ring gear. The springs will then rotate within the housing, until appropriate tension is reached, to overcome traction and move the wheels. Because of the springs, and type of housing, this power transfer is flexible and smooth, and can be made to whithstand any power surge required.

The springs can be arranged which, as shown in FIG. 2a are spaced at 90° angles, or (for only three), at 120° angles. If two spring housings 12 and 13 (FIG. 4) are used, the spacing of the springs can be either directly opposing, or at 45° or 60° spacings, depending upon the number of springs used.

This spring housing also allows different angles of travel between the two driving wheels during cornering.

Figure 3C:
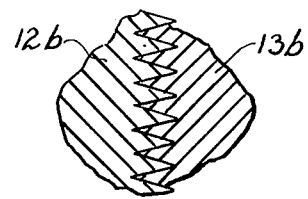

Further flexibility of this differential is achieved through the use of a modified tooth clutch mechanism 25, as illustrated in FIG. 3. This mechanism is of use primarily for hard and wide angle turning, e.g. greater than 90°. One part 12 of the clutch is attached to, or forms part of the spring housing 7. The second part of the tooth clutch 13 fits into a sleeve 14. A spring 15 within this sleeve applies appropriate tension at the second tooth clutch plate 13. Sleeve 14 is connected by means of a seal and bearing assembly 16 to axle 17. The tooth clutch plates 12, 13 can be made to suit any type of power transfer by modifying the tooth patterns as illustrated in FIGS. 3b and 3c.

To achieve even smoother action at the tooth clutch plates 12, 13 a second spring 18 of lower tensile strength applies opposing pressure on the toothed flange plate 12 by a shaft 19 which extends through the center of spring housing 7. Power is transmitted from the driving axle, through a universal joint, placed at 20 which allows easy utilization for independent suspension vehicles. The sleeve 14 is rotatably supported within an axle housing 21 by a bearing 22.

As shown in FIG. 1, power is delivered directly to the ring gear 4 and driving axle 21 (as one complete unit) of one wheel, and power is transmitted to the other wheel through the springs 5 and housing 7. Hence, if the springs, or housing, should fail or break under some very adverse condition, one wheel is always operable, thus allowing continued travel.

Figure 4:
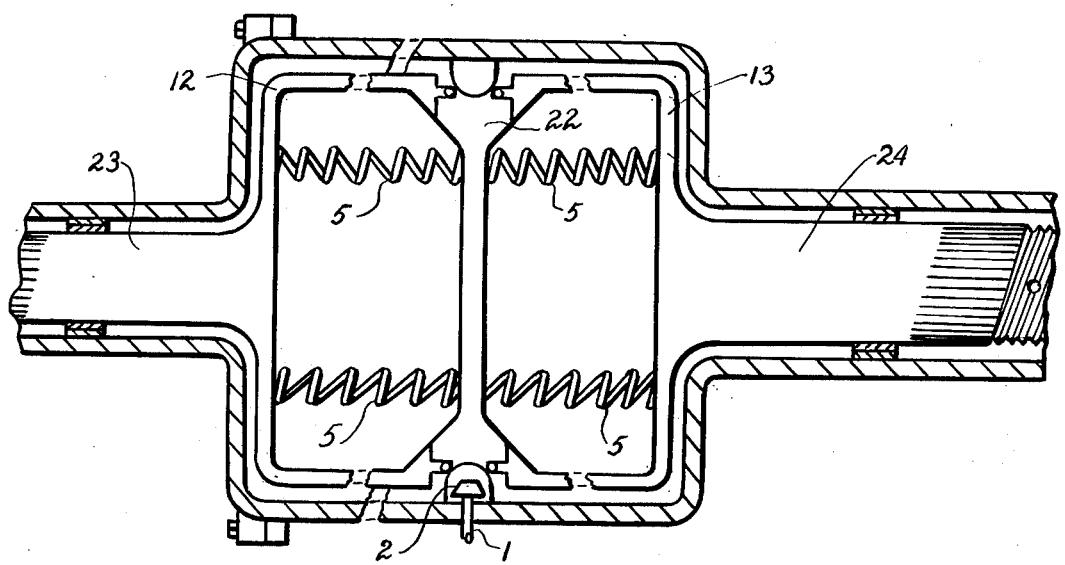
FIG. 4 shows a dual spring housing mechanism.

Further flexibility, and perhaps elimination of the tooth clutch 12, 13 can be achieved by using two spring housings on either side of a modified ring gear 22 (which incorporates on both sides the same cylindrical spring housing mechanism as illustrated in FIG. 2) as shown in FIG. 4. Hence, power could be transferred directly from the ring gear 22 to the axles 23 and 24 by the cylindrical housings 12 and 13 attached respectively to each of the driving axles 23 and 24. This type of drive would decrease weight and achieve limited slip power transfer to the wheels by a simple, smooth, flexible and rugged mechanism.

In the interest of simplicity, the other parts of the differential have been omited, and only the essential parts have been shown and described. Such details will be obvious to one skilled in this art and the operation of the differential will be readily understood by such a person skilled in this art.

Having herein described the invention, what is claimed as new is:

1. A limited slip differential comprising input drive means, a pair of axles for delivering power to each of a pair of wheels coupled thereto, an annular gear means coupled to each of said axles and said input drive means for driving said axles, and resilient means coupling said annular gear means to at least one of said axles to thereby transfer power to said axle which can rotate at a speed different from that of said other axle.

2. A limited slip differential as claimed in claim 1 in which the annular gear means is directly coupled to one axle while resiliently coupled to the other axle.

3. A limited slip differential as claimed in claim 1 in which the annular gear means is resiliently coupled to both axles.

4. A limited slip differential as claimed in claim 1 in which the resilient means comprises a cylindrical housing coupled at one end to the axle, and at the other end rotatably coupled to the annular gear means to allow movement therebetween, and at least one resilient member connecting said annular gear means and the end of said cylindrical housing connected to said shaft.

5. A limited slip differential as claimed in claim 4 having four resilient members displaced at 90° intervals connecting said annular gear means and the end of said cylindrical housing connected to said shaft.

6. A limited slip differential as claimed in claim 5 including clutch means having one plate member secured to said housing, and a second plate member moveable into engagement therewith resiliently coupled to the axle driven by said cylindrical housing.

7. A limited slip differential as claimed in claim 6 wherein each of said clutch plate members is serrated, the teeth being interlocking.

* * * * *